(12) United States Patent  (10) Patent No.: US 6,959,693 B2
Oda  (45) Date of Patent: Nov. 1, 2005

(54) FUEL INJECTION SYSTEM AND METHOD

(75) Inventor: Tomihisa Oda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 50 days.

(21) Appl. No.: 10/989,273

(22) Filed: Nov. 17, 2004

(65) Prior Publication Data

US 2005/0109319 A1   May 26, 2005

(30) Foreign Application Priority Data

Nov. 26, 2003   (JP) ............................. 2003-395673

(51) Int. Cl.[7] ............................. F02B 7/00; F02M 43/00
(52) U.S. Cl. ..................... 123/431; 123/299; 123/491; 123/304; 123/576; 123/578
(58) Field of Search ................ 123/431, 295, 123/299, 300, 304, 435, 491, 575, 576, 577, 123/578

(56) References Cited

U.S. PATENT DOCUMENTS

| | | | | |
|---|---|---|---|---|
| 5,450,829 A | * | 9/1995 | Beck | .......................... 123/435 |
| 6,318,306 B1 | * | 11/2001 | Komatsu | ........................ 123/3 |
| 6,550,430 B2 | * | 4/2003 | Gray | ...................... 123/27 GE |
| 6,666,185 B1 | * | 12/2003 | Willi et al. | .................. 123/299 |
| 6,679,224 B2 | * | 1/2004 | Stanglmaier | ................. 123/431 |
| 6,786,201 B2 | * | 9/2004 | Ohtani | ........................ 123/431 |
| 6,799,558 B2 | * | 10/2004 | Gmelin et al. | ............... 123/431 |
| 6,866,016 B2 | * | 3/2005 | Cueman | ...................... 123/299 |

FOREIGN PATENT DOCUMENTS

| | | | | |
|---|---|---|---|---|
| JP | A 2000-179368 | | 6/2000 | |
| JP | A 2000-265877 | | 9/2000 | |
| JP | 2004-197660 | * | 7/2004 | ........... F02D 19/08 |

* cited by examiner

Primary Examiner—Hai Huynh
(74) Attorney, Agent, or Firm—Oliff & Berridge PLC

(57) ABSTRACT

A fuel injection system includes a first fuel injector that injects a lower-octane fuel into a combustion chamber of an internal combustion engine, and a second fuel injector that injects a higher-octane fuel into an intake passage of the engine. When the engine temperature is equal to or lower than a predetermined temperature during a start-up period of the internal combustion engine, fuel having the lower octane is injected via the first injector while prohibiting injection of the higher octane fuel via the second fuel injector.

4 Claims, 4 Drawing Sheets

FUEL INJECTION SYSTEM AND METHOD

INCORPORATION BY REFERENCE

The disclosure of Japanese Patent Application No. 2003-395673 filed on Nov. 26, 2003 including the specification, drawings and abstract is incorporated herein by reference in its entirety.

BACKGROUND OF THE INVENTION

1. Field of Invention

The invention relates to fuel injection systems and methods.

2. Description of Related Art

Japanese Laid-Open Patent Application No. 2000-265877 discloses a fuel injection system which includes a fuel injection valve that injects fuel into an intake passage of an internal combustion engine (to be referred to as an "intake passage injection valve"), and another fuel injection valve that injects fuel into a combustion chamber of the engine (to be referred to as an "in-cylinder injection valve"). In operation, this fuel injection system injects fuel using both the valves during an engine start operation in order to prevent an engine start failure, i.e., to ensure a good engine startability.

Meanwhile, Japanese Laid-Open Patent Application No 2000-179368 discloses another fuel injection system which includes a fuel injection valve that injects fuel into an intake port of an internal combustion engine (to be referred to as an "intake port injection valve"), and an in-cylinder injection valve such as aforementioned. The intake port injection valve supplies high octane fuel while the in-cylinder injection valve supplies low octane fuel, and fuel is injected using the intake port injection valve only, or using both of the injection valves, depending upon the engine load. Namely, by selecting the injection valve(s) to be used, the octane rating of fuel in an air-fuel mixture in a combustion engine is changed in accordance with the engine load in order to prevent knocking of the engine.

In the field of internal combustion engines, in addition to ensuring a sufficient engine startability, it is earnestly desired to reduce the emission of smoke. As is known, inadequate combustion of fuel results in generation of smoke in the combustion chamber, and it is therefore important to reduce the amount of such smoke as much as possible.

SUMMARY OF THE INVENTION

In view of the foregoing situation, it is one object of the invention to reduce the emission of smoke as much as possible during an engine start operation while ensuring a sufficient engine startability.

To accomplish the above object, a first aspect of the invention relates to a fuel injection system including a first fuel injector that injects a lower-octane fuel into a combustion chamber of an internal combustion engine, a second fuel injector that injects a higher-octane fuel into an intake passage of the internal combustion engine, and a controller that controls fuel injection by the first and second fuel injectors. The controller normally causes injection of the higher-octane fuel via the second injector during a start-up period of the internal combustion engine, but alternatively causes injection of the lower-octane fuel via the first injector if the temperature of the internal combustion engine is equal to or lower than a predetermined temperature during the same period.

In the above construction in which lower-octane fuel is directly injected into the combustion chamber via the first fuel injector and higher-octane fuel is injected into the intake passage via the second fuel injector, it is possible to significantly reduce the emission of smoke while ensuring a sufficient engine startability by injecting higher octane fuel via the second fuel injector if the engine temperature is relatively high during the start operation of the internal combustion engine (i.e., engine start-up period).

Namely, although the fuel injected from the second fuel injector has a lower ignitability and a higher flammability due to its higher octane rating, the ignitability improves as the fuel is diffused in an air-fuel mixture in the combustion chamber. As is widely known, the amount of smoke reduces and the engine startability improves as the flammability of fuel increases. Thus, the aforementioned significant reduction in the emission of smoke while maintaining a sufficient engine startability is only possible when the engine temperature is relatively high. That is, if higher octane fuel is injected from the second fuel injector when the engine temperature is low, a sufficient engine startability can not be maintained. To counter this, when the engine temperate is low, lower octane fuel is injected from the first fuel injector, although this may slightly increase the emission of smoke.

Thus, according to the first aspect of the invention, when the engine temperature is equal to or lower than the predetermined temperature during an engine start-up period, lower octane fuel is injected via the first fuel injector, giving priority to maintaining a sufficient engine startability over reducing the emission of smoke. In other cases (e.g., when the engine temperature is higher than the predetermined temperature), higher octane fuel is mainly injected via the second fuel injector. By using the first fuel injector when the engine temperature is relatively low, the emission of smoke is significantly reduced while ensuring a sufficient engine startability.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
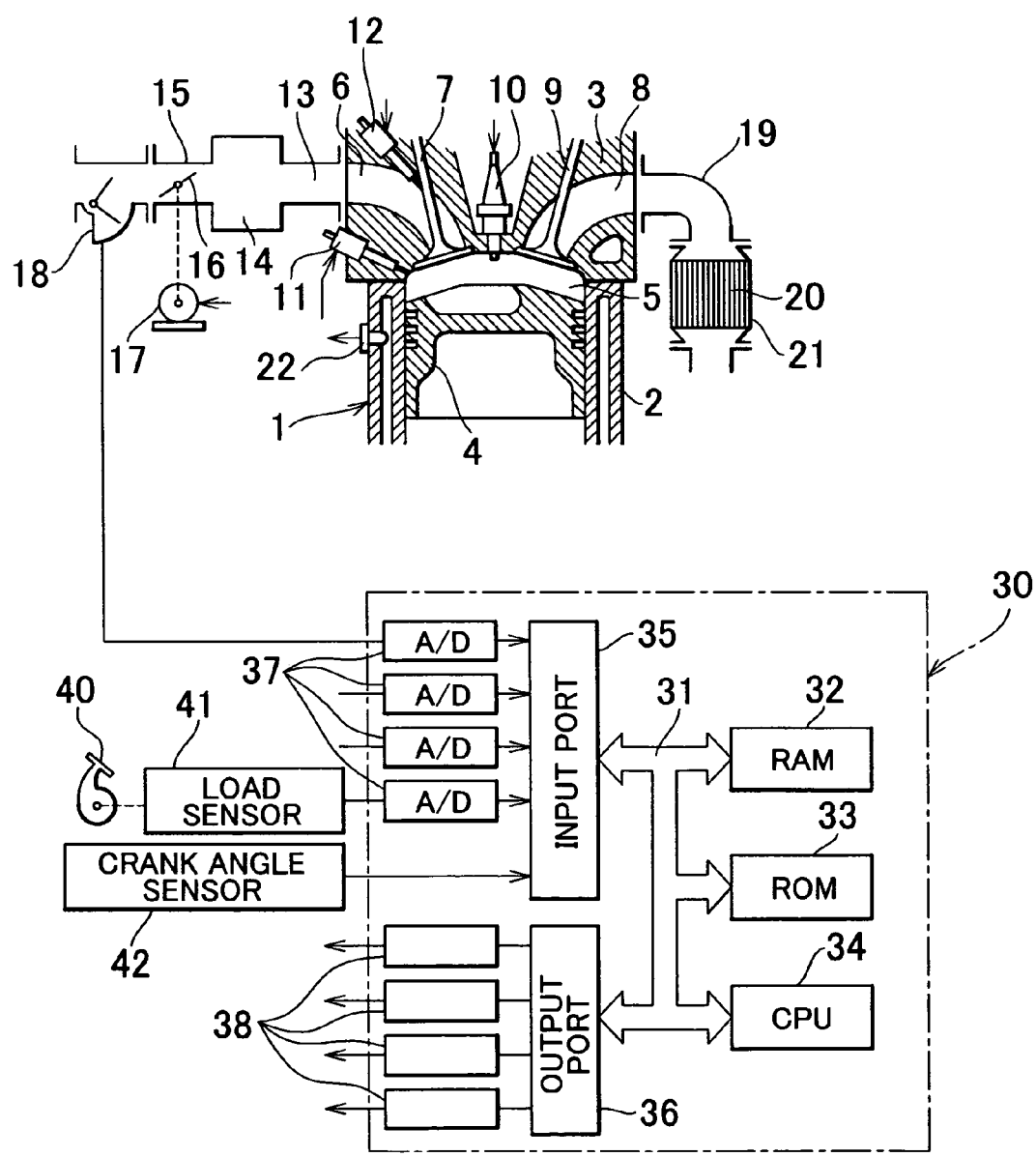
FIG. 1 is a view schematically showing the configuration of an internal combustion engine incorporating a fuel injection system according to one exemplary embodiment of the invention.

Hereinafter, a fuel injection system according to an exemplary embodiment of the invention will be described with reference to the accompanying drawings. FIG. 1 schematically shows the configuration of an internal combustion engine 1 incorporating the fuel injection system of this exemplary embodiment. The engine 1 includes a cylinder block 2, a cylinder head 3 in which an intake port 6 and an exhaust port 8 are formed, a piston 4 defining a combustion chamber 5 within the cylinder block 2, an intake valve 7, and an exhaust valve 9.

In the cylinder head 3, an igniter 10 is mounted such that its tip end is exposed inside the combustion chamber 5, and an in-cylinder fuel injector 11 is mounted at another location in the same way. In operation, the in-cylinder fuel injector 11 is supplied with low-octane fuel which it injects into the combustion chamber 5. Meanwhile, a port fuel injector 12 is also mounted in the cylinder head 3 such that its tip end is exposed inside the intake port 6. In operation, the port fuel injector 12 is supplied with high octane fuel which it injects into the intake port 6.

An intake manifold 13 is connected to the intake port 6, and an intake pipe 15 is connected to the intake manifold 13 via a surge tank 14. Within the intake pipe 15 are provided a throttle 16 driven by a stepper motor 17 so as to adjust the amount of air supplied into the combustion chamber 5, and an airflow meter 18 located upstream of the throttle 16 and which measures the amount of air flowing into the combustion chamber 5.

An exhaust pipe 19 is connected to the exhaust port 8, and a catalytic converter 21 having a catalyst 20 that removes particular components from the exhaust gas is provided along the exhaust pipe 19.

Also, a water temperature sensor 22 is provided in the cylinder block 2, and detects the temperature of coolant for cooling the engine 1. The engine temperature is determined based on the detected coolant temperature.

Here, it is to be noted that the intake port 6, the intake manifold 13, the surge tank 14, and the intake pipe 15 will be collectively referred to as an "intake passage" where necessary.

The internal combustion engine 1 is provided with an ECU (Electronic Control Unit) 30 which is a digital computer device including a RAM (Random Access Memory) 32, ROM (Read Only Memory) 33, CPU (Central Processing Unit) 34, input port 35, and output port 36, all connected via a bidirectional bus 31. The airflow meter 18 and the water temperature sensor 22 are electrically connected to the input port 35 via AD converters 37 so that a signal from each sensor is input to the input port 35 via a corresponding one of the AD converters 37. Likewise, a load sensor 41 which outputs a signal indicative of the depression amount of an accelerator pedal 40 is electrically connected to the input port 35 via another AD converter 37. Also, a crank angle sensor 42 which outputs a signal indicative of the rotational phase of the crank shaft of the engine 1, not shown, is directly connected to the input port 35 so that its signal is directly input, and the engine speed is calculated from the rotational phase of the crank shaft.

The output port 36 is connected via respective drive circuits 38 to the igniter 10, the fuel injectors 11, 12, and the stepper motor 17 that drives the throttle 16, and they operate according to signals supplied from the output port 36.

Next, the fuel injection operation of this system will be described below. In this exemplary embodiment, fuel injection is performed using only the port fuel injector 12 (which injects the higher octane fuel) if the engine temperature is higher than a predetermined temperature during an engine start-up period. Here, the "engine start-up period" represents (i) a time period until a specific length of time passes after the engine has started, (ii) a time period until a required engine load exceeds a certain value but before the specific length of time passes (e.g., when an increase in the engine load is required for acceleration), or (iii) a time period until a specific length of time passes after the engine has started while the required engine load remains below the certain value. Back to the injecting operation aforementioned, injecting only high-octane fuel via the port fuel injector 12 when the engine temperature is high during an engine start-up period advantageously reduces the amount of smoke while ensuring a sufficient engine startability. Further, the above injecting operation provides the following advantage.

That is, it is conceivable that, when fuel has been injected from the fuel injection 12 into the intake port 6, a portion of the fuel may stick to the internal wall of the intake port 6. However, as is known, such fuel is brought into the intake port 6 together with air, i.e., in the form of an air-fuel mixture in which the fuel has already been diffused adequately. Namely, the fuel sticking to the internal wall of the intake port 6 is not discharged from the combustion chamber 5. Conversely, when fuel is injected from the in-cylinder fuel injector 11, a portion of the fuel may stick to the internal wall of the combustion chamber 5, and such fuel may be discharged from the combustion chamber 5 as it is (i.e., unburned). To sum up, by injecting fuel from the port fuel injector 12 during an engine start-up period, the emission of unburned fuel from the combustion chamber 5 is advantageously reduced compared to when fuel is injected from the in-cylinder fuel injector 11.

In the meantime, if the engine temperature is lower than the predetermined temperature during the engine start-up period, fuel (lower octane fuel) is injected from the in-cylinder fuel injector 11 only. In this case, too, a sufficient engine startability is obtained although the emission of smoke (and unburned fuel) may slightly increase as compared to during fuel injection using the port fuel injector 12 only.

Figure 2A:
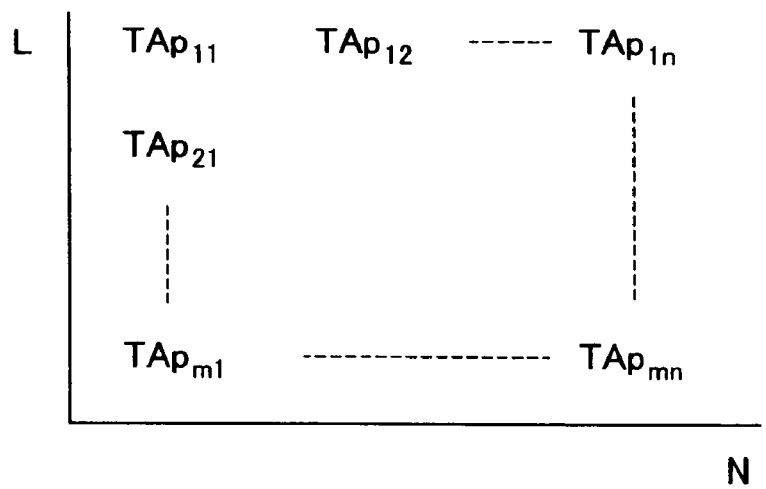
FIG. 2A is a graph representing a map used to determine a target fuel injection amount TAp based on engine speed N and required engine load L.
Figure 2B:
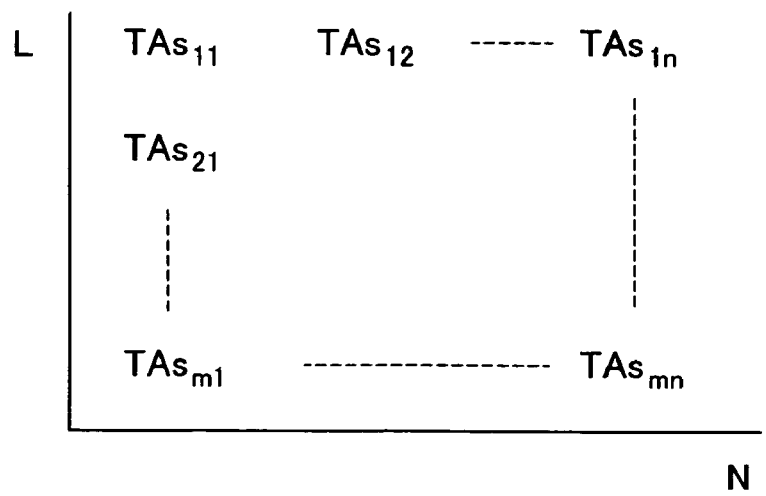
FIG. 2B is a graph representing a map used to determine target fuel injection amount TAs based on engine speed N and required engine load L.

Target fuel injection amount TAp, which represents a target amount of fuel to be injected from the port fuel injector 12 when the engine temperature is above the predetermined temperature during an engine start-up period, is preset as a function of engine speed N and required engine load L using a map as shown in FIG. 2A. Likewise, target fuel injection amount Tas, which represents a target amount of fuel to be injected from the in-cylinder fuel injector 11 when the engine temperature is equal to or lower than the predetermined temperature during an engine start-up period, is preset as a function of engine speed N and required engine load L using a map as shown in FIG. 2B. As is evident from the maps, target fuel injection amounts TAp and TAs tend to increase with an increase in engine speed N and required engine load L.

Figure 3A:
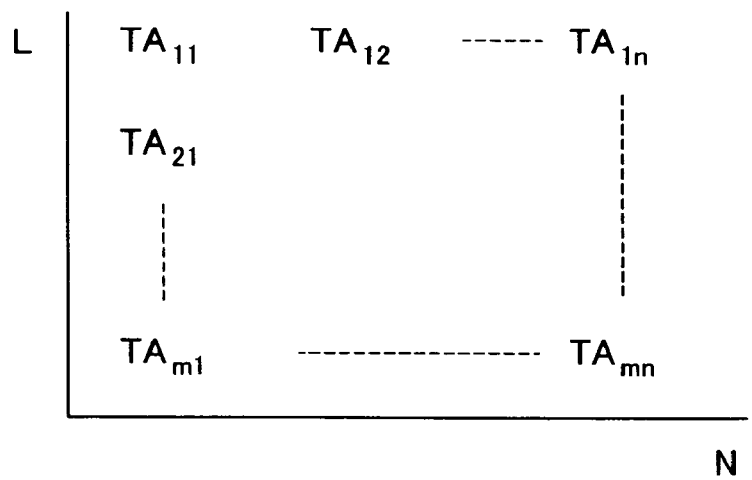
FIG. 3A is a graph representing a map used to determine target total fuel injection amount TA based on engine speed N and required engine load L.
Figure 3B:
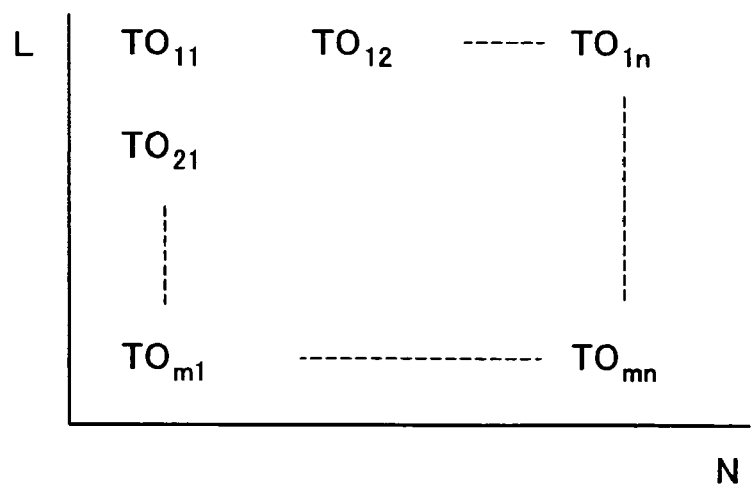
FIG. 3B is a graph representing a map used to determine target octane rating TO based on engine speed N and required engine load L.

During engine operation other than an engine start-up period (to be referred to as "normal engine operation"), fuel injection can be performed using both the in-cylinder fuel injector 11 and the port fuel injector 12 such that the total amount of fuel supplied into the combustion chamber 5 matches a target total fuel injection amount TA set as a function of engine speed N and required engine load L using a map of FIG. 3A, and the average octane rating of air-fuel mixtures matches a target octane rating TO set as a function of engine speed N and required engine load L using a map of FIG. 3B. Thus, the fuel amount injected from each injector is calculated based on the target total fuel injection amount TA and the target octane rating TO.

As is evident from FIGS. 3A and 3B, the target total fuel injection amount TA and the target octane rating TO tend to increase with an increase in engine speed N and required engine load L. While it has been mentioned that the in-cylinder fuel injector 11 and the port fuel injector 12 are both used during normal engine operation, it is to be understood that only one of the injectors may be used depending on the value of the target octane rating TO. For example, when the engine is idling after a certain length of time has passed from an engine start, and the required engine load remains below the predetermined value, fuel may be injected from the in-cylinder fuel injector 11 only.

Figure 4:
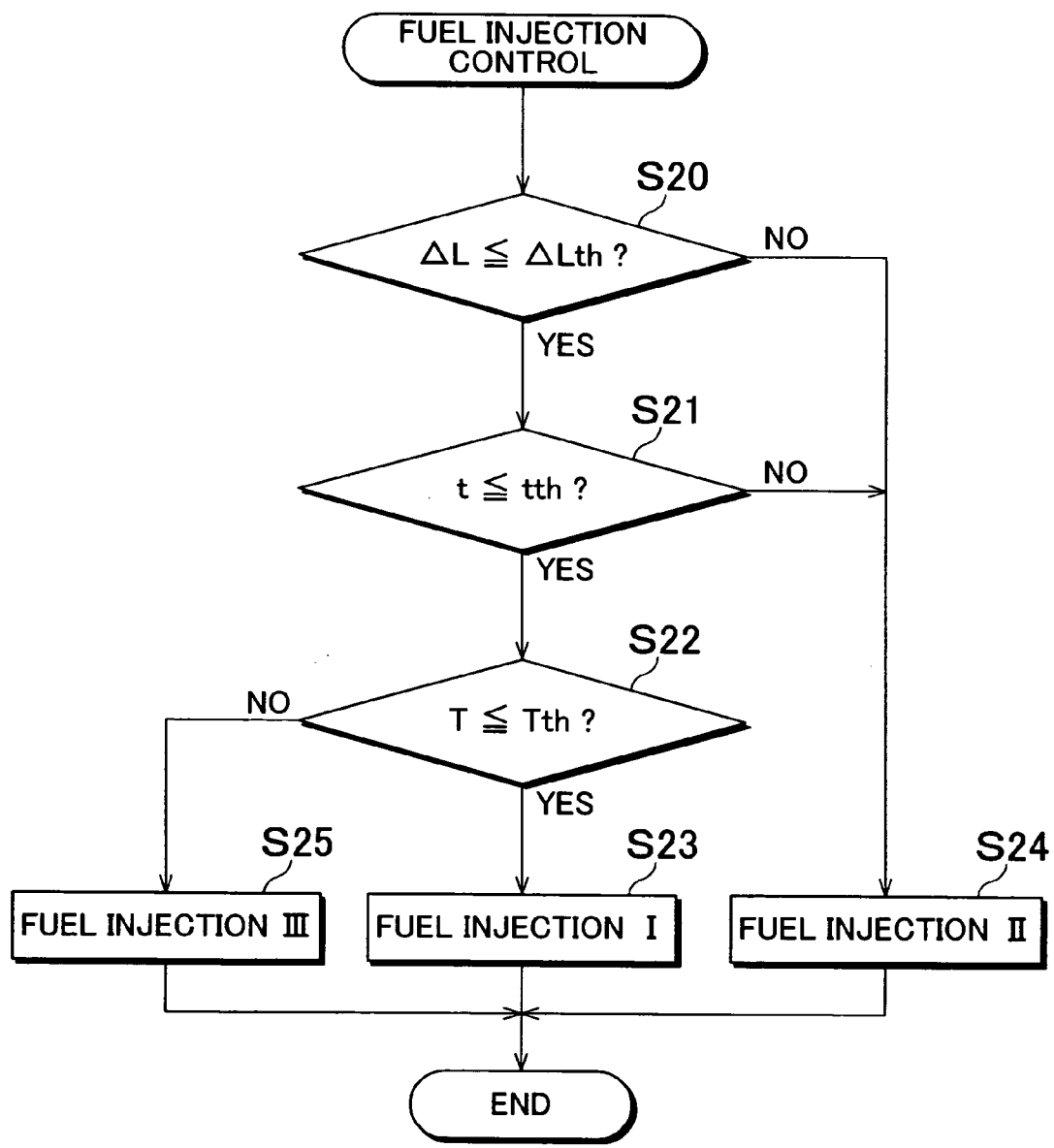
FIG. 4 is a flowchart showing one exemplary routine executed by the fuel injection system shown in FIG. 1.

FIG. 4 is a flowchart showing one exemplary control routine for fuel injection executed in this embodiment. Referring to the flowchart, it is first determined in step 20 (S20) whether an increased quantity $\Delta L$ in the required engine load L is equal to or less than a threshold $\Delta Lth$ ($\Delta L \leq \Delta Lth$ ?), in order to judge if acceleration is required. If "yes", the routine proceeds to step S21. If "no" ($\Delta L > \Delta Lth$), the routine proceeds to step S24.

In step S24, fuel injection II is performed, in which fuel is injected in the same manner as during the normal engine operation described above. More specifically, fuel injection is performed using both the in-cylinder fuel injector 11 and the port fuel injector 12 such that the total amount of fuel supplied into the combustion chamber 5 matches a target total fuel injection amount TA set based on engine speed N and required engine load L using the map of FIG. 3A, and the average octane rating of air-fuel mixtures matches a target octane rating TO set based on engine speed N and required engine load L using the map of FIG. 3B.

In step S21, on the other hand, it is determined whether the time t representing the length of time after engine start is equal to or shorter than a threshold time tth ($t \leq tth$ ?). If "yes", the routine proceeds to step S22. If "no" ($t > tth$), the routine proceeds to step S24 and fuel injection II is performed.

In step S22, it is determined whether the engine temperature T is equal to or less than a threshold temperature Tth ($T \leq Tth$ ?). If "yes", the routine proceeds to step S23. In step S23, fuel injection I is performed by setting a target fuel injection amount TAs based on engine speed N and required engine load L using the map of FIG. 2B and injecting lower octane fuel from the in-cylinder fuel injector 11 so as to satisfy the target fuel injection amount TAs.

If "no" in step S22 (T>Tth), the routine proceeds to step S25. In step S25, fuel injection III is performed by setting a target fuel injection amount TAp based on engine speed N and required engine load L using the map of FIG. 2A, and injecting fuel from the port fuel injector 12 so as to satisfy the target fuel injection amount TAp.

Although fuel is injected from the in-cylinder fuel injector 11 and no fuel is injected from the port fuel injector 12 if it is determined in step S22 that engine temperature T is equal to or lower than the threshold temperature Tth, the invention is not limited to this control process. For example, fuel may be injected via both the in-cylinder fuel injector 11 and the port fuel injector 12 such that the ratio of fuel amount injected from the in-cylinder fuel injector 11 to the total fuel amount supplied into the combustion chamber is made greater than when engine temperature T is higher than threshold temperature Tth by setting the injection amount, injection timing or injection time period of each injector appropriately.

While the invention has been applied to a spark-ignition type internal combustion engine that ignites fuel using igniters in the aforementioned exemplary embodiment, it may alternatively be applied to a compression-ignition type internal combustion engine that ignites air-fuel mixtures through compression.

The values of the parameters (start-up period and predetermined temperature) that are used to determine whether to use the in-cylinder injector or the port injector during engine start-up, can be determined empirically, and will vary depending on various factors, such as, for example, the engine design and the desired performance of the engine. In addition, "low octane" and "high octane" as used herein, are not intended to mean any particular octane level, but merely are used to define the relative octane level of two different fuels. For example, with one type of engine, the low octane fuel may be 87 octane (or lower) and the high octane fuel may be 89 octane (or higher), while with another type of engine, the low octane fuel may be 89 octane (or lower) and the high octane fuel may be 91 octane (or higher).

The controller (e.g., the ECU 30) of the illustrated exemplary embodiments is implemented as a programmed general purpose computer. It will be appreciated by those skilled in the art that the controller can be implemented using one or more special purpose integrated circuits (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using one or more suitably programmed general purpose computers, e.g., microprocessor, microcontroller or other processor devices (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments and constructions. The invention is intended to cover various modifications and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. A fuel injection system comprising:
   a first fuel injector that injects fuel having a first octane rating into a combustion chamber of an internal combustion engine;
   a second fuel injector that injects fuel having a second octane rating into an intake passage of the internal combustion engine, the second octane rating being higher than the first octane rating; and
   a controller that causes only injection of fuel having the second octane rating via the second fuel injector during a start-up period of the internal combustion engine, wherein the controller alternatively causes injection of fuel having the first octane rating via the first fuel injector while prohibiting injection of fuel having the second octane rating via the second fuel injector if a temperature of the internal combustion engine is equal to or lower than a predetermined temperature during the start-up period of the internal combustion engine.

2. A fuel injection system according to claim 1, wherein the controller determines an amount of fuel having the first octane rating to be injected via the first fuel injector based on an engine speed and a required engine load of the internal combustion engine.

3. A method of controlling fuel injection in an internal combustion engine, comprising:

detecting a temperature of the internal combustion engine during a start-up period of the internal combustion engine;

injecting a higher-octane fuel into an intake passage of the internal combustion engine while prohibiting injection of a lower-octane fuel into a combustion chamber of the internal combustion engine during the start-up period of the internal combustion engine if the detected temperature of the internal combustion engine is higher than a predetermined temperature; and injecting the lower-octane fuel into the combustion chamber of the internal combustion engine while prohibiting injection of the higher-octane fuel into the intake passage of the internal combustion engine if the detected temperature of the internal combustion engine is equal to or lower than the predetermined temperature.

4. A method according to claim 3, further comprising:

determining an amount of the lower-octane fuel to be injected into the combustion chamber based on an engine speed and a required engine load of the internal combustion engine.

* * * * *